US009944564B2

United States Patent
Amini et al.

(10) Patent No.: US 9,944,564 B2
(45) Date of Patent: Apr. 17, 2018

(54) CERAMIC ARTICLE AND METHOD THEREFOR USING PARTICLE INFILTRATION AND PRECERAMIC POLYMER INFILTRATION

(71) Applicant: United Technologies Corporation, Farmington, CT (US)

(72) Inventors: Shahram Amini, Glastonbury, CT (US); Xia Tang, West Hartford, CT (US); Wayde R. Schmidt, Pomfret Center, CT (US); Tania Bhatia Kashyap, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/032,350

(22) PCT Filed: Oct. 21, 2014

(86) PCT No.: PCT/US2014/061518
§ 371 (c)(1),
(2) Date: Apr. 27, 2016

(87) PCT Pub. No.: WO2015/065764
PCT Pub. Date: May 7, 2015

(65) Prior Publication Data
US 2016/0264477 A1    Sep. 15, 2016

Related U.S. Application Data

(60) Provisional application No. 61/897,243, filed on Oct. 30, 2013.

(51) Int. Cl.
C04B 35/64     (2006.01)
C04B 35/80     (2006.01)
(Continued)

(52) U.S. Cl.
CPC .......... *C04B 35/806* (2013.01); *C04B 35/571* (2013.01); *C04B 35/64* (2013.01);
(Continued)

(58) Field of Classification Search
CPC ....... B22F 1/0059; C22C 47/08; C22C 47/06; C22C 47/068; B29C 67/202;
(Continued)

(56) References Cited

U.S. PATENT DOCUMENTS 3,090,094 A * 5/1963 Schwartzwalder .... B01D 39/20
156/89.11
5,034,593 A * 7/1991 Rice ........................ B23K 9/291
219/136
(Continued)

FOREIGN PATENT DOCUMENTS

EP    1277716    1/2003
EP    1359132    11/2003

OTHER PUBLICATIONS

The International Preliminary Report on Patentability for PCT Application No. PCT/US2014/061518, dated May 12, 2016.
(Continued)

*Primary Examiner* — Noah S Wiese
(74) *Attorney, Agent, or Firm* — Carlson, Gaskey & Olds P.C.

(57) ABSTRACT

A method of fabricating a ceramic article includes providing a porous body that includes a plurality of fiber bundles that has an intra-bundle porosity and an inter-bundle porosity, infiltrating the intra-bundle porosity and the inter-bundle porosity with a mixture of particles in a liquid carrier, the particles having an average size selected with respect to at least the intra-bundle porosity, removing the liquid carrier from the porous body to deposit the particles in the intra-bundle porosity and in the inter-bundle porosity, infiltrating
(Continued)

a preceramic polymer into a remaining intra-bundle porosity and a remaining inter-bundle porosity, and thermally converting the preceramic polymer to a ceramic material.

13 Claims, 3 Drawing Sheets

(51) Int. Cl.
    *C04B 35/571*     (2006.01)
    *C04B 41/52*     (2006.01)

(52) U.S. Cl.
    CPC .......... *C04B 41/52* (2013.01); *C04B 2235/32* (2013.01); *C04B 2235/3804* (2013.01); *C04B 2235/3817* (2013.01); *C04B 2235/3826* (2013.01); *C04B 2235/3852* (2013.01); *C04B 2235/3891* (2013.01); *C04B 2235/422* (2013.01); *C04B 2235/483* (2013.01); *C04B 2235/5208* (2013.01); *C04B 2235/5244* (2013.01); *C04B 2235/5248* (2013.01); *C04B 2235/616* (2013.01)

(58) Field of Classification Search
    CPC ... B29C 70/025; C04B 35/571; C04B 35/589; C04B 35/6316; C04B 35/632; C04B 35/80; C04B 35/83
    See application file for complete search history.

(56) References Cited

U.S. PATENT DOCUMENTS

| | | | |
|---|---|---|---|
| 5,196,235 A | | 3/1993 | Parlier et al. |
| 5,439,627 A | * | 8/1995 | De Jager ............... B22F 1/0059 264/129 |
| 5,853,653 A | * | 12/1998 | Donato ................ C04B 35/571 264/625 |
| 6,537,617 B2 | | 3/2003 | Nakamura et al. |
| 2004/0152581 A1 | | 8/2004 | Bardes et al. |
| 2004/0192534 A1 | * | 9/2004 | Nixon ................. C04B 35/565 501/95.2 |
| 2008/0265471 A1 | | 10/2008 | Colopy |
| 2013/0011654 A1 | * | 1/2013 | Han ..................... C04B 35/571 428/293.4 |
| 2013/0085057 A1 | | 4/2013 | Schmidt et al. |
| 2013/0122763 A1 | | 5/2013 | Fish et al. |
| 2013/0167374 A1 | | 7/2013 | Kirby et al. |
| 2013/0224471 A1 | * | 8/2013 | Sheedy .................. C04B 41/81 428/312.6 |

OTHER PUBLICATIONS

International Search Report and The Written Opinion for PCT/US2014/061518 dated Jan. 22, 2015.
U.S. Appl. No. 13/251,644, filed Oct. 30, 2011.
Extended European Search Report for European Patent Application No. 14858836.1, completed Jun. 13, 2017.

* cited by examiner

CERAMIC ARTICLE AND METHOD THEREFOR USING PARTICLE INFILTRATION AND PRECERAMIC POLYMER INFILTRATION

CROSS-REFERENCE TO RELATED APPLICATION

This application claims priority to U.S. Provisional Application No. 61/897,243, filed Oct. 30, 2013.

BACKGROUND

Ceramic articles can be produced using any of various known ceramic processing techniques. One example structure includes a ceramic matrix and fibers that are dispersed in the matrix (ceramic matrix composite or "CMC"). The matrix can be deposited among the fibers using a polymer-infiltration-pyrolysis ("PIP") process, for example. The PIP process typically involves infiltrating a fiber structure with a preceramic polymer, and then thermally converting the preceramic polymer to ceramic material. The infiltration process can be repeated to achieve a desired density in the structure. However, this and other known ceramic processing techniques can result in deficiencies, such as incomplete densification, microcracking and residual unreacted material. These deficiencies can later debit the properties of the structure, such as long term oxidative stability, environmental durability and mechanical properties

SUMMARY

A method of fabricating a ceramic article according to an example of the present disclosure includes providing a porous body that includes a plurality of fiber bundles that has an intra-bundle porosity and an inter-bundle porosity, infiltrating the intra-bundle porosity and the inter-bundle porosity with a mixture of particles in a liquid carrier, the particles having an average size selected with respect to at least the intra-bundle porosity, removing the liquid carrier from the porous body to deposit the particles in the intra-bundle porosity and in the inter-bundle porosity, infiltrating a preceramic polymer into a remaining intra-bundle porosity and a remaining inter-bundle porosity, and thermally converting the preceramic polymer to a ceramic material.

In a further embodiment of any of the foregoing embodiments, the particles include ceramic-based particles.

In a further embodiment of any of the foregoing embodiments, the ceramic-based particles and the ceramic material have equivalent composition.

In a further embodiment of any of the foregoing embodiments, the equivalent composition is silicon carbide (SiC).

In a further embodiment of any of the foregoing embodiments, the average size of the particles is selected with respect to a size factor of the intra-bundle porosity such that the particles can fit into the intra-bundle porosity.

In a further embodiment of any of the foregoing embodiments, the average size of the particles is selected with respect to a threshold size above which the particles substantially block infiltration into the intra-bundle porosity and below which the particles infiltrate into the intra-bundle porosity.

In a further embodiment of any of the foregoing embodiments, the particles fill, by volume, 10%-70% of a combined volume of the intra-bundle porosity and the inter-bundle porosity.

In a further embodiment of any of the foregoing embodiments, the particles fill, by volume, 15%-40% of a combined volume of the intra-bundle porosity and the inter-bundle porosity.

In a further embodiment of any of the foregoing embodiments, the remaining inter-bundle porosity is defined between the plurality of fiber bundles and the particles as deposited.

A ceramic article according to an example of the present disclosure includes a fiber structure that includes a plurality of fiber bundles with intra-bundle porosity and inter-bundle porosity. A plurality of particles has an average size with respect to the intra-bundle porosity. The plurality of particles is dispersed in the intra-bundle porosity and the inter-bundle porosity. A ceramic material is dispersed in a remaining intra-bundle porosity and a remaining inter-bundle porosity of the fiber structure.

In a further embodiment of any of the foregoing embodiments, the plurality of particles include ceramic-based particles.

In a further embodiment of any of the foregoing embodiments, the ceramic-based particles and the ceramic material have equivalent composition.

In a further embodiment of any of the foregoing embodiments, the equivalent composition is silicon carbide (SiC).

In a further embodiment of any of the foregoing embodiments, the average size of the plurality of particles is selected with respect to a size factor of the intra-bundle porosity such that the particles can fit into the intra-bundle porosity.

In a further embodiment of any of the foregoing embodiments, the plurality of particles fill, by volume, 10%-70% of a combined volume of the intra-bundle porosity and the inter-bundle porosity.

In a further embodiment of any of the foregoing embodiments, the remaining inter-bundle porosity is defined between the plurality of fiber bundles and the particles.

A method of fabricating a ceramic article according to an example of the present disclosure includes infiltrating a porosity of a porous body with a mixture of particles in a liquid carrier, removing the liquid carrier from the porous body to deposit the particles in the porous body, infiltrating a preceramic polymer into a remaining porosity between the deposited particles of the porous body, and thermally converting the preceramic polymer to a ceramic material.

In a further embodiment of any of the foregoing embodiments, the particles fill, by volume, 10%-70% of the porosity of the porous body.

In a further embodiment of any of the foregoing embodiments, the particles fill, by volume, 15%-40% of the porosity of the porous body.

In a further embodiment of any of the foregoing embodiments, the particles and the ceramic material are silicon-based materials.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Disclosed is a ceramic article and a method of fabricating the ceramic article. As an example, the ceramic article can be a component of a gas turbine engine or other machine, but is not limited to such components.

One example of the method includes infiltrating the porosity of a porous body with a mixture of particles in a liquid carrier, removing the liquid carrier from the porous body to deposit the particles in the porous body, removing the liquid carrier, infiltrating a preceramic polymer into the remaining porosity between the deposited particles of the porous body, and thermally converting the preceramic polymer to a ceramic material. The use of the particles reduces the volumetric amount of ceramic material required from conversion of the preceramic polymer, thus reducing the processing steps related to the infiltration and conversion of the ceramic material.

The preceramic polymer can be a silicon-containing polymer. An example silicon-containing polymer has a silicon-containing backbone chain. Example silicon-containing polymers that have silicon-containing backbone chains include polysilazanes, polysilanes, polycarbosilanes, polycarbosiloxanes, polyborosilazanes and polysiloxanes, but are not limited to these. In further examples, the silicon-containing polymer can include filler particles that can be the same or different than the particles infiltrated in the mixture with the liquid carrier, with respect to composition, but the silicon-containing polymer could alternatively be free of any filler particles.

The method can be used with various types of porous bodies to enhance the properties of the ceramic article. Example porous bodies can include fiber structures, open-pore foams or foam-like structures, or other structures that have an internal interconnected porosity. Fiber structures can include discontinuous or continuous fibers, and the continuous fibers may be arranged in woven, non-woven, braided, knitted or other known fiber architectures. The method is not limited to any particular type of porous body, although fiber structures may be desirable in many applications, such as gas turbine engines.

Figure 1:
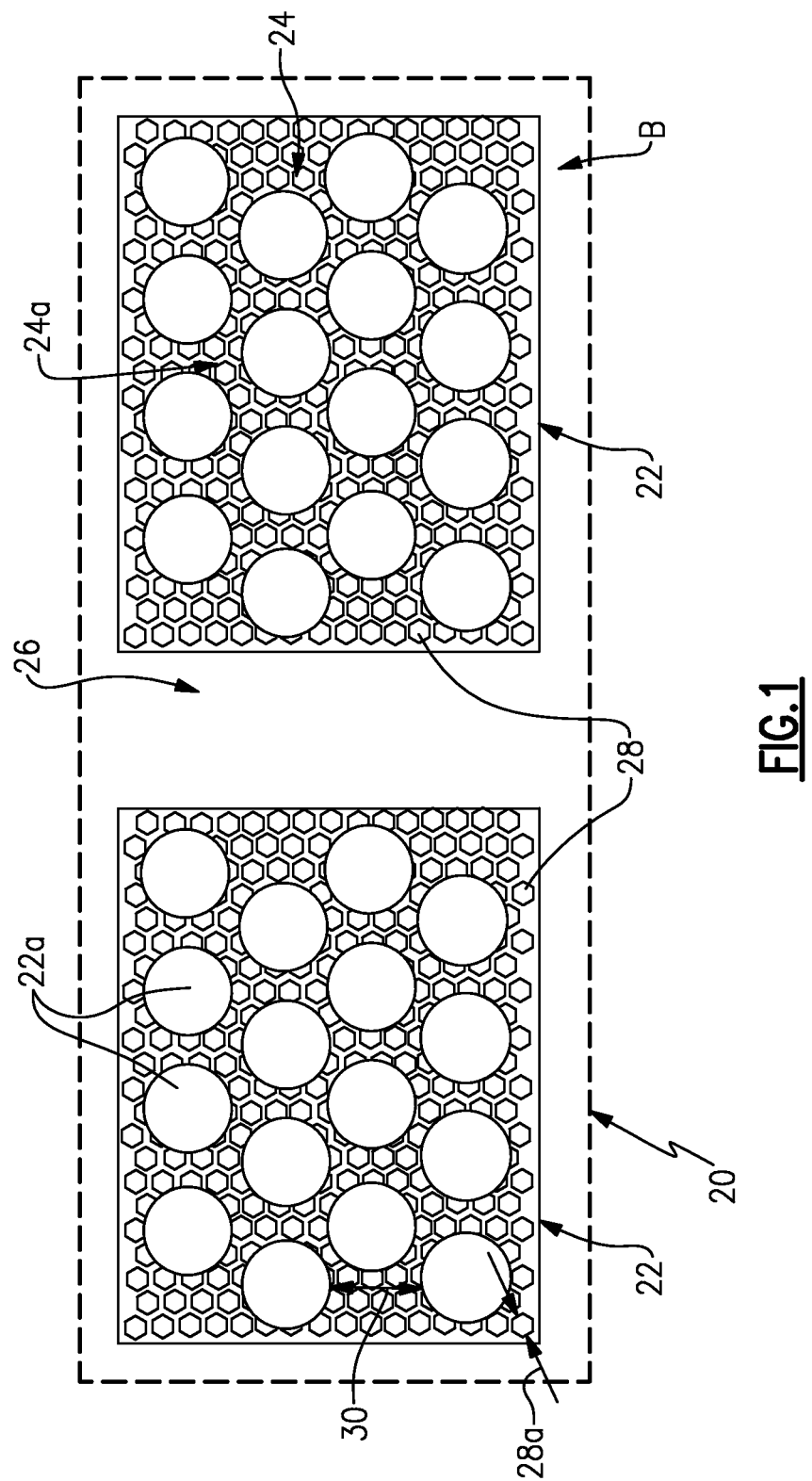
FIG. 1 illustrates a ceramic article fabricated according to this disclosure.

FIG. 1 schematically illustrates a representative portion of a ceramic article 20, which will be used to describe further examples of the method herein. In this example, the method includes providing a porous body B, which here is a fiber structure that includes a plurality of fiber bundles 22. In this example, each fiber bundle 22 has an intra-bundle porosity 24 and an inter-bundle porosity 26.

As used herein, a fiber bundle is a group of fibers 22a that is spatially distinct from other groups of fibers. The fibers in a group can be twisted or untwisted, or can have other arrangements, but have interconnected spaces between individual fibers that form the intra-bundle porosity. The prefix "intra-" used in the context of a bundle refers to porosity inside the periphery of a group of fibers of that bundle. The prefix "inter-" used in the context of a plurality of bundles refers to porosity between distinct groups of fibers. Further, inter-bundle porosity and intra-bundle porosity are mutually exclusive.

The method further includes infiltrating the intra-bundle porosity 24 and the inter-bundle porosity 26 with a mixture of particles 28 in a liquid carrier. For example, the particles 28 can be selected according to the desired end-use properties of the ceramic article 20. In one example, the particles 28 include ceramic-based particles. Example ceramic-based particles can include carbide particles, nitride particles, oxide particles, boride particles, silicide particles, carbonaceous particles, oxynitride particles, oxycarbide particles and combinations thereof, but are not limited to these ceramic materials. In a further example, the particles are silicon carbide particles. Metallic particles could also be used in substitution of, or in supplement to, the ceramic-based particles.

The liquid carrier can be a solvent in which the particles can be mixed and dispersed or suspended uniformly. Example solvents can include water, or polar or non-polar hydrocarbon or organic solvents. The solvent will later be removed. If the solvent is to be removed by evaporation, a solvent that is readily vaporized can be used. A dispersant can be used to assist dispersion of the particles and maintain particle suspension during infiltration. Example dispersants can be small molecule or polymeric surfactants. Further example dispersants can be oxygen- or nitrogen-containing polymer surfactants that are soluble in the solvent used.

In order to infiltrate the particles 28 into the intra-bundle porosity 24 the particles 28 have an average size, represented at 28a, that is selected with respect to at least the intra-bundle porosity 24. For example, the average size 28a of the particles 28 is selected with respect to a size factor of the intra-bundle porosity 24 such that the particles 28 can fit into the intra-bundle porosity 24. If the average size of the particles 28 is too large, the particles 28 would agglomerate at the surfaces of the bundles rather than infiltrating into the intra-bundle porosity 24. If the particles 28 were to agglomerate, the agglomerations would fully or substantially fully block infiltration into the intra-bundle porosity 24 and potentially debit the properties of the end article. Thus, for a given intra-bundle 24 size factor, there can be a corresponding threshold average particle size above which the particles 28 fully or substantially fully block infiltration into the intra-bundle porosity 24 and below which the particles 28 can infiltrate into the intra-bundle porosity 24. The selection of the average particle size in correspondence with the size factor, to be below the threshold, ensures that the particles 28 can infiltrate into the intra-bundle porosity 24. As an example, the size factor of the intra-bundle porosity 24 can be, or can be factored upon, an average spacing, represented at 30, between the fibers 22a in the bundles 22. Such spacings can be determined by the spacing in the initial bundles 22 prior to infiltration, by experiment and microscopic inspection, or both, for example, but are not limited to such techniques.

After the infiltration, the liquid carrier is removed from the porous body B. For example, the liquid carrier can be removed from the porous body B by evaporation. Heat can be applied to the porous body B to facilitate the removal. With or without heat, the ambient pressure around the porous body B can be reduced to facilitate the removal.

As the liquid carrier is removed, the particles fall out of suspension and deposit in the intra-bundle porosity 24 and in the inter-bundle porosity 26. The liquid carrier can be fully or substantially fully removed. Further residual liquid carrier may remain in the porous body B after the removal step and may be removed secondarily in later thermal processing steps. In one example, the deposited particles 28 fill, by volume, 10%-70% of a combined volume of the intra-bundle porosity 24 and the inter-bundle porosity 26. In a further example, the deposited particles 28 fill, by volume, 15%-40% of a combined volume of the intra-bundle porosity 24 and the inter-bundle porosity 26. In further examples, the fill percentage can be as high as practical limits dictate, which can be based on factors such as the size and type of particles 28 and the type of liquid carrier. An increase in the amount of the particles 28 in the liquid carrier causes an increase in the viscosity of the mixture. Thus, there can be a balance between the loading amount of particles 28 in the mixture and the viscosity at which the mixture can effectively infiltrate into the porous body B.

After the removal of the liquid carrier, the porous body B includes the fiber bundles 22 and the particles 28 deposited in the intra-bundle porosity 24 and inter-bundle porosity 26. In this intermediate state, the selected composition of the particles is chemically unchanged relative to the initial composition of the particles 28 prior to infiltration.

A preceramic polymer is then infiltrated, between the particles 28, into the remaining intra-bundle porosity and the remaining inter-bundle porosity. The remaining intra-bundle porosity is the open space, represented at 24a, between the deposited, still chemically unchanged particles 28. The porous body B is then thermally treated to convert the preceramic polymer to a ceramic material. The infiltration and thermal treatment represent one cycle or iteration of a polymer-infiltration-pyrolysis ("PIP") process. Multiple PIP process cycles can be used.

The thermal treatment can be conducted in a controlled-temperature environment and a controlled-gas environment. The controlled-temperature environment can be above 1000° C., but is not limited to any particular temperature and will depend at least partially upon the type of preceramic polymer selected. The controlled-gas environment can also be selected at least partially based upon the type of preceramic polymer and desired end ceramic material. As an example, the controlled-gas environment can include a reactive or unreactive gas with respect to the preceramic polymer. Thus, in FIG. 1, the white background area is filled or substantially filled with the ceramic material, which embeds or substantially embeds the fiber bundles 22 and the particles 28.

In one example that may be useful for turbomachine components, the particles 28 and the ceramic material have equivalent ceramic-based compositions. In a further example, the fibers 22a are silicon carbide or carbon fibers, the particles 28 are silicon carbide particles, and the ceramic material is silicon carbide.

In a further example, the particles 28 are unreactive during the thermal treatment to convert the preceramic polymer. Thus, the particles 28 are present in the ceramic article 20 in a chemically unchanged state with respect to the chemical composition prior to the thermal treatment to convert the preceramic polymer. However, in other examples, the particles 28 can be reactive during the thermal treatment to convert the preceramic polymer, and react with one or more of the process-gas in the controlled-gas environment, the preceramic polymer, and other particles 28, to form secondary phases in the ceramic article. These secondary phases can be ceramic material phases, intermetallic phases, or combinations thereof.

The particles 28 reduce the volume of the intra-bundle porosity 24 and inter-bundle porosity 26 that is occupied by the PIP-derived ceramic material. A thermal conversion of a preceramic polymer to a ceramic material can result in microvoids, microcracks, or the like, that occur from the shrinkage and other factors. Such features can provide points of ingress for oxygen, moisture or other substances that can contribute to debiting the properties of the article. The particles 28 occupy a volumetric portion of the intra-bundle porosity 24 and the inter-bundle porosity 26 and thus displace the PIP-derived ceramic. Thus, the PIP-derived ceramic is present in a lower volume, and in smaller volumetric domains, than it would be if the particles 28 were not used. To the extent that there are microvoids, microcracking, or the like, the amount of such features can therefore be reduced because there is a lower volume of the PIP-derived ceramic. Furthermore, fewer microvoids and microcracks can provide an increase in the average spacing between the microvoids and microcracks and thus can reduce the degree to which such features are interconnected to form an open network for ingress of air, oxygen moisture, etc. As a result, the ceramic article 20 produced according to this disclosure can provide enhanced properties, such as enhanced environmental durability.

Figure 2A:
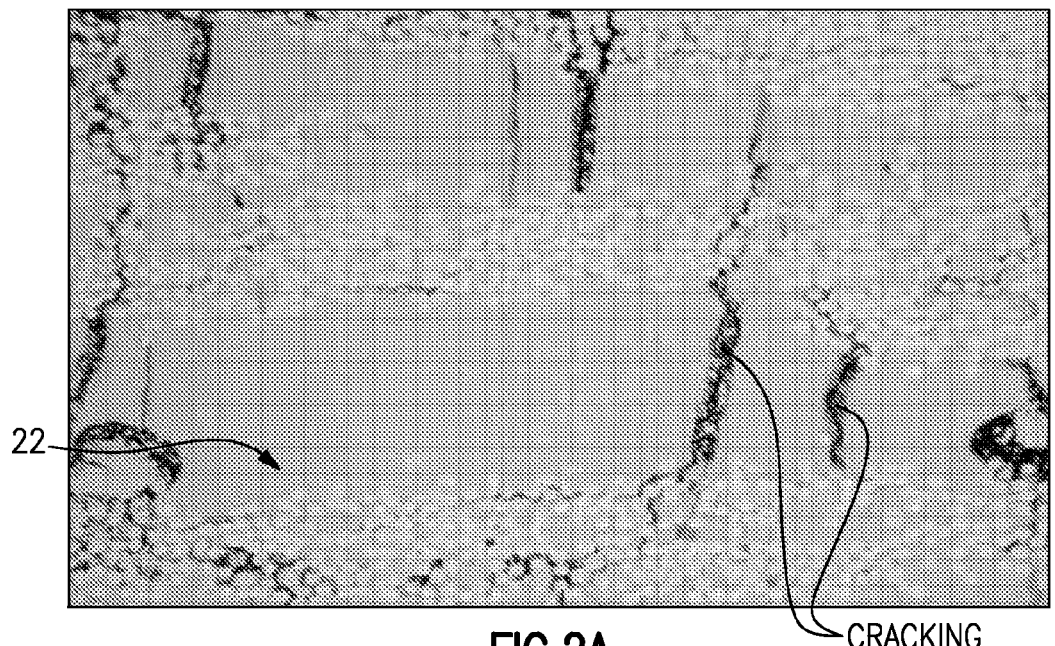
FIG. 2A and FIG. 2B illustrate micrographs of a ceramic article fabricated according to this disclosure.
Figure 2B:
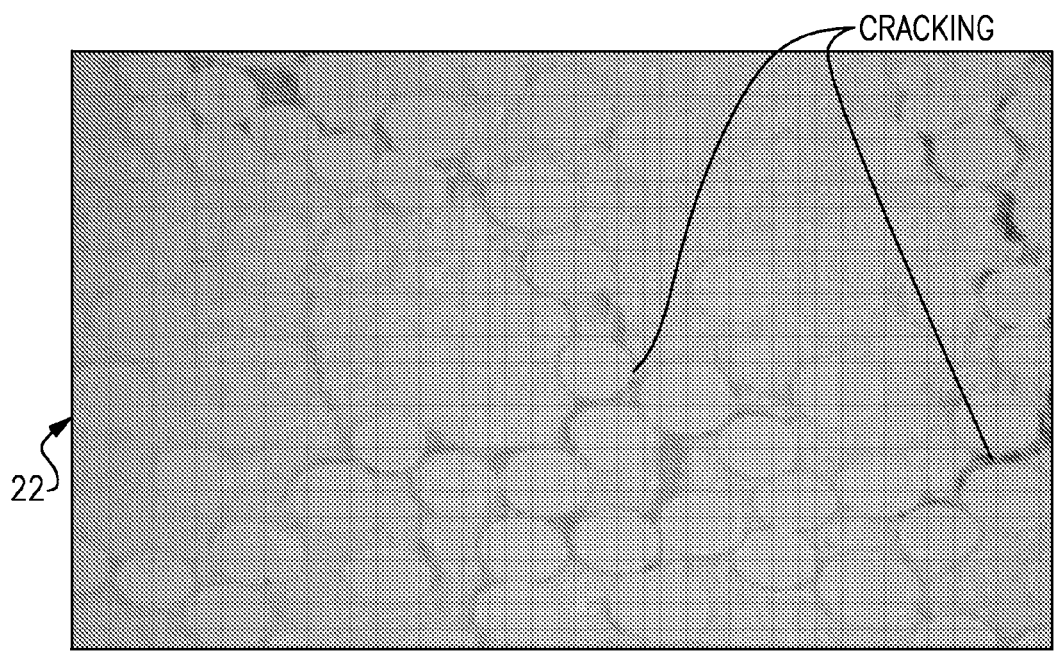
Figure 3A:
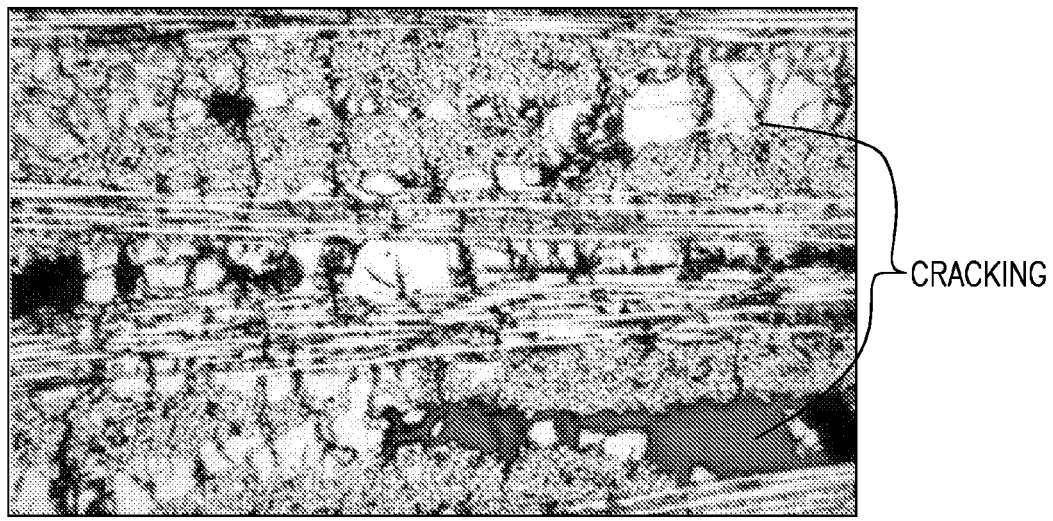
FIG. 3A and FIG. 3B illustrate micrographs of a comparison ceramic article.
Figure 3B:
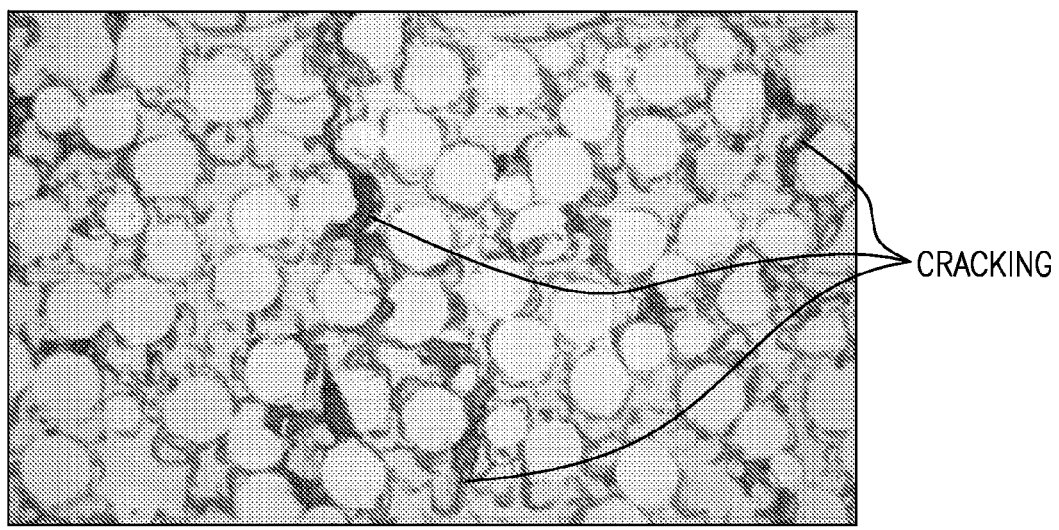

FIG. 2A and FIG. 2B show micrographs of a cross-section of a ceramic article fabricated according to this disclosure. As shown in the micrographs, the article includes some cracking, but the amount of cracking is relatively low. As a comparison, FIG. 3A and FIG. 3B show micrographs of cross-sections of a comparison ceramic article that also has fiber bundles but was infiltrated only with a preceramic polymer and not with a mixture of particles prior to the preceramic polymer infiltration. As shown in these micrographs, there is a greater amount of cracking. Thus, the methodology disclosed herein can mitigate or reduce microcracking and thus reduce potential point of ingress for oxygen, moisture and the like.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of fabricating a ceramic article, the method comprising:
    providing a porous body that includes a plurality of fiber bundles that has an intra-bundle porosity and an inter-bundle porosity;
    infiltrating the intra-bundle porosity and the inter-bundle porosity with a mixture of particles in a liquid carrier, the particles having an average size selected with respect to at least the intra-bundle porosity;
    removing the liquid carrier from the porous body to deposit the particles in the intra-bundle porosity and in the inter-bundle porosity, wherein the particles fill, by volume, 10%-70% of a combined volume of the intra-bundle porosity and the inter-bundle porosity;
    infiltrating a preceramic polymer into a remaining intra-bundle porosity and a remaining inter-bundle porosity; and
    thermally converting the preceramic polymer to a ceramic material.

2. The method as recited in claim 1, wherein the particles include ceramic-based particles.

3. The method as recited in claim 2, wherein the ceramic-based particles and the ceramic material have equivalent composition.

4. The method as recited in claim 3, wherein the equivalent composition is silicon carbide (SiC).

5. The method as recited in claim 1, wherein the average size of the particles is selected with respect to a size factor of the intra-bundle porosity such that the particles can fit into the intra-bundle porosity.

6. The method as recited in claim 1, wherein the average size of the particles is selected with respect to a threshold size above which the particles substantially block infiltration into the intra-bundle porosity and below which the particles infiltrate into the intra-bundle porosity.

7. The method as recited in claim 1, wherein the particles fill, by volume, 15%-40% of a combined volume of the intra-bundle porosity and the inter-bundle porosity.

8. The method as recited in claim 1, wherein the remaining inter-bundle porosity is defined between the plurality of fiber bundles and the particles as deposited.

9. A ceramic article comprising:
a fiber structure including a plurality of fiber bundles with intra-bundle porosity and inter-bundle porosity;
a plurality of particles having an average size with respect to the intra-bundle porosity, the plurality of particles being dispersed in the intra-bundle porosity and the inter-bundle porosity, such that the plurality of particles fill, by volume, 10%-70% of the intra-bundle porosity and the inter-bundle porosity, there being a remaining intra-bundle porosity and a remaining inter-bundle porosity that is not taken up by the plurality of particles; and
a ceramic material dispersed in the remaining intra-bundle porosity and the remaining inter-bundle porosity of the fiber structure.

10. The ceramic article as recited in claim 9, wherein the plurality of particles include ceramic-based particles.

11. The ceramic article as recited in claim 10, wherein the ceramic-based particles and the ceramic material have equivalent composition.

12. The ceramic article as recited in claim 11, wherein the equivalent composition is silicon carbide (SiC).

13. The ceramic article as recited in claim 9, wherein the average size of the plurality of particles is selected with respect to a size factor of the intra-bundle porosity such that the particles can fit into the intra-bundle porosity.

* * * * *

UNITED STATES PATENT AND TRADEMARK OFFICE
CERTIFICATE OF CORRECTION

PATENT NO. : 9,944,564 B2
APPLICATION NO. : 15/032350
DATED : April 17, 2018
INVENTOR(S) : Shahram Amini et al.

It is certified that error appears in the above-identified patent and that said Letters Patent is hereby corrected as shown below:

In the Specification

Column 1 Line 12 please add the following section after the CROSS-REFERENCE TO RELATED APPLICATION section and before the BACKGROUND section:
--STATEMENT REGARDING FEDERALLY SPONSORED RESEARCH OR DEVELOPMENT
This invention was made with government support under Contract No N00014-10-C-0195 awarded by the United States Navy. The Government has certain rights in this invention.--

Signed and Sealed this
Twenty-sixth Day of March, 2019

Andrei Iancu
*Director of the United States Patent and Trademark Office*